United States Patent
Sun et al.

(10) Patent No.: US 9,444,594 B2
(45) Date of Patent: Sep. 13, 2016

(54) ALLOCATING ORTHOGONAL FREQUENCY-DIVISION MULTIPLE ACCESS (OFDMA) RESOURCES IN DATA OVER CABLE SERVICES INTERFACE SPECIFICATION (DOCSIS) NETWORKS

(71) Applicant: Futurewei Technologies, Inc., Plano, TX (US)

(72) Inventors: Fanglin Sun, Santa Clara, CA (US); Dao Pan, Santa Clara, CA (US); Li Zhang, Wuhan (CN); Jim Chen, Corona, CA (US)

(73) Assignee: Futurewei Technologies, Inc., Plano, TX (US)

( * ) Notice: Subject to any disclaimer, the term of this patent is extended or adjusted under 35 U.S.C. 154(b) by 209 days.

(21) Appl. No.: 14/258,428

(22) Filed: Apr. 22, 2014

(65) Prior Publication Data

US 2014/0348179 A1    Nov. 27, 2014

Related U.S. Application Data

(60) Provisional application No. 61/814,714, filed on Apr. 22, 2013, provisional application No. 61/817,534, filed on Apr. 30, 2013.

(51) Int. Cl.
*H04L 5/00* (2006.01)
*H04B 10/27* (2013.01)
(Continued)

(52) U.S. Cl.
CPC ............. *H04L 5/0044* (2013.01); *H04B 10/27* (2013.01); *H04J 14/00* (2013.01); *H04L 5/0064* (2013.01); *H04L 27/2697* (2013.01); *H04Q 11/0067* (2013.01); *H04B 3/00* (2013.01); *H04J 2203/0089* (2013.01); *H04L 12/2801* (2013.01)

(58) Field of Classification Search
CPC ............. H04L 5/0044; H04L 27/2697; H04L 5/0064; H04L 12/2801; H04Q 11/0067; H04B 10/27; H04B 3/00; H04J 14/00; H04J 2203/0089
See application file for complete search history.

(56) References Cited

U.S. PATENT DOCUMENTS 8,085,802 B1   12/2011   Monk et al.
8,498,294 B1   7/2013    Monk et al.
(Continued)

OTHER PUBLICATIONS

Foreign Communication From A Counterpart Application, PCT Application No. PCT/US2014/034989, International Search Report dated Aug. 4, 2014, 5 pages.
(Continued)

*Primary Examiner* — Paul H Masur
*Assistant Examiner* — Kabir Jahangir
(74) *Attorney, Agent, or Firm* — Conley Rose, P.C.; Grant Rodolph; Adam J. Stegge

(57) ABSTRACT

A Cable Modem Termination System (CMTS) comprising a receiver configured to receive a plurality of upstream transmission request messages from a plurality of coaxial units via an electro-optical network, wherein the upstream transmission request messages each request permission to transmit a specified amount of data, a processor coupled to the receiver and configured to allocate Orthogonal Frequency-Division Multiplexing (OFDM) minislots to each coaxial unit based on the amount of data requested in the associated upstream transmission request message, and a transmitter coupled to the processor and configured to transmit at least one Uplink Allocation Map (UL-MAP) message to indicate minislot allocations to the coaxial units.

17 Claims, 6 Drawing Sheets

(51) Int. Cl.
   *H04J 14/00*    (2006.01)
   *H04Q 11/00*    (2006.01)
   *H04L 27/26*    (2006.01)
   *H04L 12/28*    (2006.01)
   *H04B 3/00*     (2006.01)

(56) References Cited

U.S. PATENT DOCUMENTS

| | | |
|---|---|---|
| 2005/0025145 A1 | 2/2005 | Rakib et al. |
| 2005/0114904 A1 | 5/2005 | Monk et al. |
| 2007/0254608 A1 | 11/2007 | Bougard |
| 2009/0047957 A1 | 2/2009 | Westerberg |
| 2009/0092196 A1 | 4/2009 | Okunev |
| 2009/0129788 A1 | 5/2009 | Seimetz |
| 2009/0196262 A1 | 8/2009 | Chin et al. |
| 2009/0196602 A1 | 8/2009 | Saunders et al. |
| 2010/0157920 A1 | 6/2010 | Choi et al. |
| 2010/0158036 A1 | 6/2010 | Choi et al. |
| 2011/0185263 A1* | 7/2011 | Chapman ............ H04L 12/2801 714/776 |
| 2012/0087664 A1 | 4/2012 | Zhang et al. |
| 2012/0257892 A1 | 10/2012 | Boyd et al. |
| 2013/0004155 A1 | 1/2013 | Liang et al. |
| 2013/0004179 A1 | 1/2013 | Nielsen et al. |
| 2014/0314418 A1 | 10/2014 | Sun et al. |

OTHER PUBLICATIONS

Foreign Communication From A Counterpart Application, PCT Application No. PCT/US2014/034989, Written Opinion dated Aug. 4, 2014, 5 pages.

Foreign Communication From A Counterpart Application, PCT Application No. PCT/US2014/034985, International Search Report dated Jul. 31, 2014, 5 pages.

Foreign Communication From A Counterpart Application, PCT Application No. PCT/US2014/034985, Written Opinion dated Jul. 31, 2014, 5 pages.

"IEEE Standard for Information Technology—Telecommunications and Information Exchange Between Systems—Local and Metropolitan Area Networks—Specific Requirements, Part 3: Carrier Sense Multiple Access with Collision Detection (CSMA/CD) Access Method and Physical Layer Specifications, Amendment: Media Access Control Parameters, Physical Layers, and Management Parameters for Subscriber Access Networks", IEEE Standard 802.3ah, Sep. 7, 2004, 640 pages.

"IEEE Standard for Information Technology—Telecommunications and Information Exchange Between Systems—Local and Metropolitan Area Networks—Specific Requirements, Part 3: Carrier Sense Multiple Access with Collision Detection (CSMA/CD) Access Method and Physical Layer Specifications, Amendment 1: Physical Layer Specifications and Management Parameters for 10 Gb/s Passive Optical Networks", IEEE Standard 802.3av, Oct. 30, 2009, 236 pages.

IEEE Standard for Information Technology—Telecommunications and Information Exchange Between Systems—Local and Metropolitan Area Networks—Specific Requirements, Part 11: Wireless LAN Medium Access Control (MAC) and Physical Layer (PHY) Specifications:, IEEE Standard 802.11, Jun. 12, 2007, 1232 pages.

"Data-Over-Cable Service Interface Specifications Docsis 3.1, Physical Layer Specification", CM-SP-PHYV3.1-I02-140320, CableLabes, Mar. 20, 2014, 236 pages.

"Data-Over-Cable Service Interface Specifications DOCSIS 3.1, MAC and Upper Layer Protocols Interface Specification", CM-SP-MULPIv3.1-I02-140320, Mar. 20, 2014, 789 pages.

Office Action dated Oct. 7, 2015, 25 pages, U.S. Appl. No. 14/258,419, filed Apr. 22, 2014.

Notice of Allowance dated Feb. 12, 2016, 13 pages, U.S. Appl. No. 14/258,419, filed Apr. 22, 2014.

* cited by examiner

ALLOCATING ORTHOGONAL FREQUENCY-DIVISION MULTIPLE ACCESS (OFDMA) RESOURCES IN DATA OVER CABLE SERVICES INTERFACE SPECIFICATION (DOCSIS) NETWORKS

CROSS-REFERENCE TO RELATED APPLICATIONS

The present application claims priority to U.S. Provisional Patent Application 61/814,714, filed Apr. 22, 2013 by Fang Lin Sun, et. al., and entitled "Method and Apparatus of Allocating Orthogonal Frequency-Division Multiple Access Resource Blocks in Ethernet Passive Optical Network Protocol Over Coaxial" and U.S. Provisional Patent Application 61/817,534, filed Apr. 30, 2013 by Fang Lin Sun, et. al., and entitled "Method and Apparatus of Allocating Orthogonal Frequency-Division Multiple Access Resource Blocks in Ethernet Passive Optical Network Protocol Over Coaxial", both of which are incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A Passive Optical Network (PON) is one system for providing core network access to end users. A PON may be a Point-to-Multipoint (P2MP) network with passive splitters positioned in an Optical Distribution Network (ODN) to enable a single feeding fiber from a central office to serve multiple customer premises. PON may employ different wavelengths for upstream and downstream transmissions. Ethernet PON (EPON) is a PON standard developed by the Institute of Electrical and Electronics Engineers (IEEE) and specified in IEEE documents 802.3ah and 802.3av, both of which are incorporated herein by reference. Hybrid access networks employing both EPON and other network types have attracted growing attention.

SUMMARY

In one embodiment, the disclosure includes a Cable Modem Termination System (CMTS) comprising a receiver configured to receive a plurality of upstream transmission request messages from a plurality of coaxial units via an electro-optical network, wherein the upstream transmission request messages each request permission to transmit a specified amount of data, a processor coupled to the receiver and configured to allocate Orthogonal Frequency-Division Multiplexing (OFDM) minislots to each coaxial unit based on the amount of data requested in the associated upstream transmission request message, and a transmitter coupled to the processor and configured to transmit at least one Uplink Allocation Map (UL-MAP) message to indicate minislot allocations to the coaxial units.

In another embodiment, the disclosure includes a Cable Modem (CM) comprising a transmitter configured to transmit an upstream transmission request message toward a CMTS via an electro-optical network, wherein the upstream transmission request message requests permission to transmit a specified amount of data, a receiver configured to receive an UL-MAP message in response to the upstream transmission request message, wherein the UL-MAP message indicates an OFDM minislot allocation for transmission across the electro-optical network, and a processor coupled to the transmitter and receiver and configured to cause the transmitter to transmit the data by employing time and frequency resources indicated by the OFDM minislot allocation.

In another embodiment, the disclosure includes a method comprising receiving, by a CMTS, a Request (REQ) message from a CM to request transmission opportunities, transmitting a Upstream Bandwidth Allocation Map message to the CM to allocate bandwidth on an Orthogonal Frequency-Division Multiple Access (OFDMA) upstream channel in units of minislots, wherein the minislots comprise a fixed size specified by a number of symbols in a frame combined with a number of data subcarriers per minislot, wherein the minislots comprise a variable bit loading based on the a location of each minislot in the frame, and wherein each minislot employs only contiguous subcarriers.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
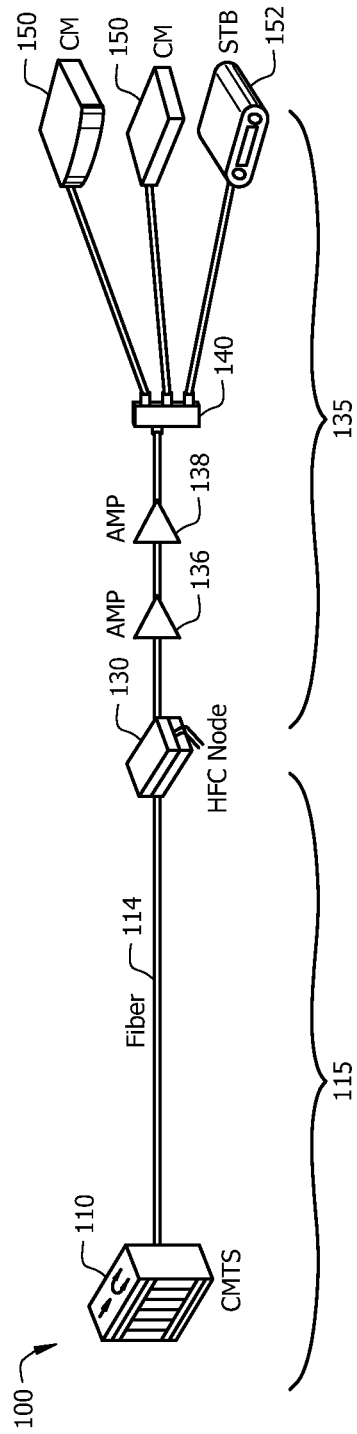
FIG. 1 is a schematic diagram of an embodiment of a DOCSIS network.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Some hybrid access networks may combine optical networks with coaxial (coax) networks. Ethernet over Coax (EoC) may be a generic name used to describe all technologies that transmit Ethernet frames over a coaxial network. Examples of EoC technologies may include EPON over Coaxial (EPoC), DOCSIS, Multimedia over Coax Alliance (MoCA), G.hn (a common name for a home network technology family of standards developed under the International Telecommunication Union (ITU) and promoted by the HomeGrid Forum), home phoneline networking alliance (HPNA), and home plug audio/visual (A/V). EoC technologies may have been adapted to run outdoor coax access from an Optical Network Unit (ONU) to an EoC head end with connected Customer Premises Equipment (CPEs) located in subscriber homes. In a coaxial network, physical layer transmission may employ OFDM to encode digital data onto multiple carrier frequencies. Some advantages of OFDM transmission may include high spectral efficiency and robust transmission (e.g. attenuation at high frequencies in long coaxial wires, narrow band interferers, frequency selective noise, etc.). A DOCSIS network may operate over a Hybrid Fiber Coax (HFC) network. The DOCSIS network may comprise a CMTS positioned in a local exchange or central office where the CMTS may connect the HFC network to a backbone network. The CMTS may serve a plurality of CMs positioned at end-user locations. In some embodiments, a CMTS may be integrated with P2MP OFDM communication functionalities (e.g. channel estimation, scheduling).

Disclosed herein is a mechanism for allocating upstream grants across the electro-optical network in the time and frequency domains. The time and frequency employed to transmit an amount of data may be grouped as a minislot in a DOCSIS network. A CMTS operating in the optical network may receive upstream transmission requests from a plurality of CMs in the electrical network. The requests may indicate an amount of data that each CM wishes to transmit upstream. The CMTS may allocate minislot(s) to each CM based on the data amount requested and a modulation profile associated with each CM. The profiles may be configurable based on electrical network connectivity constraints (e.g. Signal to Noise Ratio (SNR)) associated with each CM. Each CM may be assigned minislots comprising different time or frequency resources. Pilot signals may be inserted in the minislots to differentiate between data transmissions (e.g. by different CMs in adjacent time/frequency slots.) In an embodiment, a minislot may comprise a portion of an OFDM symbol, where each minislot comprises the same bit loading capacity. In another embodiment, a minislot may comprise a portion of an OFDM symbol, where each minislot comprises the same number of subcarriers (e.g. frequencies, tones, etc.) and different bit loading capacity. In either embodiment, each sub-carrier (e.g. tone, frequency set, etc.) in a minislot may comprise the same Quadrature Amplitude Modulation (QAM) constellation/modulation order as all other subcarriers in the minislot. Subcarriers in different minislots may comprise different QAM constellations. Data carrying pilot signals may comprise a lower modulation order than non-pilot signals in the same minislot. The present disclosure further relates to U.S. non-provisional application by Fang Lin Sun, et. al. and entitled "Allocating Orthogonal Frequency-Division Multiple Access (OFDMA) Resources In Data Over Cable Services Interface Specification (DOCSIS) Networks", which is filed herewith and is incorporated by reference as if reproduced in its entirety.

FIG. 1 is a schematic diagram of an embodiment of a DOCSIS network 100. The DOCSIS network 100 may be a DOCSIS 3.1 network as specified in DOCSIS 3.1 documents CM-SP-PHYv3.1-I02-140320, CM-SP-MULPIv3.1-I02-140320 which are incorporated herein by reference as if reproduced in their entirety. The network 100 may comprise a CMTS 110, at least one HFC node 130, and any number of CMs 150 and/or Set-Top Boxes (STBs) 152. Specifically, the HFC node 130 may be coupled to the CMTS 110 via an optical fiber 114, and the CMs 150 and/or STB 152 may be coupled to the HFC node 130 via electrical cables, one or more amplifiers (e.g., amplifiers 136 and 138), and at least one splitter 140.

The CMTS 110 may be any device configured to communicate with the CMs 150 via the HFC node 130. The CMTS 110 may act as an intermediary between the CMs 150 and another backbone network (e.g. the Internet). The CMTS 110 may forward data received from a backbone network to the CMs 150 and forward data received from the CMs 150 onto the backbone network. The CMTS 110 may comprise an optical transmitter and an optical receiver transmitting and/or receiving messages from the CMs 150 via the optical fiber 114. The CMTS 110 may further comprise transmitters and/or receivers for communicating with the backbone network. When the backbone network employs a network protocol that is different from the protocol used in network 100, the CMTS 110 may comprise a converter that may convert the backbone network protocol into the protocol of the network 100. The CMTS 110 converter may also convert the network 100 protocol into the backbone network protocol. The CMTS 110 may also be configured to schedule all upstream and downstream transmissions across network 100, so that transmissions between the CMTS 110 and the CMs 150 may be separated in the time and/or frequency domain, which may allow the transmissions to be separated at an associated destination. An allocation of time and/or frequency resources may be transmitted to the CMs 150 via an Uplink Media Access Plan (UL-MAP) messages and/or Downlink Media Access Plan (DL-MAP) messages.

The CMs 150 and STBs 152 may be any devices that are configured to communicate with the CMTS 110 and any subscriber devices in a local network. The CMs 150 and STBs 152 may act as intermediaries between the CMTS 110 and such subscriber devices. CMs 150 and STBs 152 may be similar devices, but may be employed to couple to different subscriber devices in some embodiments. For example, an STB 152 may be configured to interface with a television, while a CM 150 may be configured to interface with any local network device with an Internet Protocol (IP) and/or Media Access Control (MAC) address, such as a local computer, a wired and/or wireless router, or local content server, a television, etc. The CMs 150 may forward data received from the CMTS 110 to the subscriber devices, and may forward data received from subscriber devices toward the CMTS 110. Although the specific configuration of the CMs 150 may vary depending on the type of network 100, in an embodiment, the CMs 150 may comprise an electrical transmitter configured to send electrical signals to the CMTS 110 via the HFC node 130 and an electrical receiver configured to receive electrical signals from the CMTS 110 via the HFC node 130. Additionally, the CMs 150 may comprise a converter that may convert network 100 electrical signals into electrical signals for subscriber devices, such as signals in IEEE 802.11 wireless local area network (WiFi) protocol. The CMs 150 may further comprise a second transmitter and/or receiver that may send and/or receive the converted electrical signals to the subscriber devices. In some embodiments, CMs 150 and Coaxial Network Terminals (CNTs) are similar, and thus the terms are used interchangeably herein. The CMs 150 may be typically located at distributed locations, such as the customer premises, but may be located at other locations as well. CMs 150 may transmit a configurable number of OFDM frames upstream toward the CMTS 110 via the HFC node 130 as part of a transmission burst. An OFDM frame may be a communication burst of a specified duration comprising a signal with a plurality of frequency based subcarriers. An OFDM frame may comprise a configurable number of OFDM symbols with smaller durations than the OFDM frame. OFDM symbols may comprise a configurable number of minislots, where minislots may be a shorter duration than an OFDM symbol and may comprise less than all frequencies in the OFDM symbol.

The HFC node 130 may be positioned at the intersection of an Optical Distribution Network (ODN) 115 comprising optical fiber 114 and an Electrical Distribution Network (EDN) 135. HFC node 130 may include electro-optical signal translation capabilities (e.g. Open Systems Interconnection (OSI) model layer 1 capabilities). The HFC node 130 may not be configured to perform routing, buffering, or other higher layer functions (e.g. OSI model layer 2-7). Accordingly, the HFC node 130 may translate optical signals received from the optical fiber 114 into electrical signals and forward the electrical signals toward the CMs 150 and STBs 152, and vice versa. It should be noted that that the HFC node 130 may be remotely coupled to the CMTS 110 or reside in the CMTS 110. In some embodiments, the CMTS 110 may be equipped with part or all of the functionalities of the HFC node 130.

The ODN 115 may be a data distribution system that may comprise optical fiber 114 cables, couplers, splitters, distributors, and/or other equipment. In an embodiment, the optical fiber 114 cables, couplers, splitters, distributors, and/or other equipment may be passive optical components. Specifically, the optical fiber cables, couplers, splitters, distributors, and/or other equipment may be components that do not require any power to distribute data signals between the CMTS 110 and the HFC node 130. It should be noted that the optical fiber 114 cables may be replaced by any optical transmission media in some embodiments. In some embodiments, the ODN 115 may comprise one or more optical amplifiers. In some embodiments, data distributed across the ODN 115 may be combined with cable television (CATV) services using multiplexing schemes. The ODN 115 may extend from the CMTS 110 to the HFC node 130 in a branching configuration as shown in FIG. 1, but may be alternatively configured as determined by a person of ordinary skill in the art. Signals transmitted across the ODN 115 may be transmitted as analog signals.

The EDN 135 may be a data distribution system that may comprise electrical cables (e.g. coaxial cables, twisted wires, etc.), couplers, splitters, distributors, and/or other equipment. In an embodiment, the electrical cables, couplers, splitters, distributors, and/or other equipment may be passive electrical components. Specifically, the electrical cables, couplers, splitters, distributors, and/or other equipment may be components that do not require any power to distribute data signals between the HFC node 130 and the CMs 150. It should be noted that the electrical cables may be replaced by any electrical transmission media in some embodiments. In some embodiments, the EDN 135 may comprise one or more electrical amplifiers. The EDN 135 may extend from the HFC node 130 and the CMs 150 in a branching configuration as shown in FIG. 1, but may be alternatively configured as determined by a person of ordinary skill in the art. The EDN 135 may be configured to communicate electrical signals in an analog form to support OFDM/OFDMA.

The components of network 100 may be employed to allocate OFDM minislots to the CMs 150 for upstream transmission across the EDN 135 and/or ODN 115. In an embodiment, the CMTS 110 may consider upstream transmission requests from the CMs 150 received in a DOCSIS request message, such as a service addition requests, service change requests, or any other request noted in DOCSIS 3.1 documents CM-SP-PHYv3.1-I02-140320, CM-SP-MULPIv3.1-I02-140320. The CMTS 110 may consider the amount of data each CM 150 wishes to transmit along with connectivity constraints (e.g. SNR, power constraints, etc.) associated with each CM 150 (e.g. based on an associated bit loading profile, and may assign appropriate OFDM minislots to each CM 150. The CMTS 110 may develop a media access plan for all upstream transmissions, and may broadcast a UL-MAP message comprising the plan to all CMs 150. The UL-MAP message may indicate the allocation via minislot number, specify the OFDM subcarriers to be employed along with a byte or bit count, and/or indicate a transmission duration. The CMTS 110 may also indicate pilot signals to be employed by the CMs 150 during transmission. Such pilot symbols may be placed in the transmission to allow the CMTS 110 to distinguish between transmissions from different CMs 150. The pilot symbols may or may not comprise data. All signals in a minislot may employ the same modulation order, but signals in different minislots may comprise different modulation orders. In an embodiment pilot signals may comprise the same modulation order as other pilot signals in a minislot, but may comprise a lower modulation order than data signals in the minislot.

Minislots may be allocated based on predefined rules for network 100. For example, each OFDM frame may comprise a plurality of OFDM symbols. Each OFDM symbol may comprise a plurality of subcarriers. Minislots may be selected so that each minislot has the same bit-loading capacity. Such a minislot selection may result in varied numbers of active frequencies, tones, subcarriers, etc., as some subcarriers may comprise differing bit-loading capacities than other subcarriers. Minislots may also be selected so that each minislot comprises the same number of active subcarriers, but a different bit loading capacity. As an example a minislot with sub-carrier spacing of twenty five kilohertz (kHZ) may comprise sixteen data subcarriers, while a minislot with sub-carrier spacing of fifty kHZ may comprise eight data subcarriers. Such minislots may be dynamically configured by the CMTS 110 during allocation in some embodiments. All active subcarriers in a minislot may comprise the same QAM constellation/modulation order. Active subcarriers in different minislots may comprise different QAM constellation/modulation orders. Pilot signals may comprise different (e.g. lower) QAM constellation/modulation orders than other data subcarriers in the same resource block. Both subcarriers and pilot signals may carry data in some embodiments. Pilot signals may also be referred to as complementary subcarriers. Minislots may also be defined to include only contiguous subcarriers. The bitloading of complementary pilots and/or data subcarriers may be constant in a minislot, but may vary between minislots. It should be noted that the minislots may also employ other transmission protocols such as Forward Error Correction (FEC) coding, etc.

It should be noted that OFDMA may be a similar technology to OFDM. Specifically, OFDMA may be a subset of OFDM that may employ dynamic allocation of time/frequency resources. Accordingly, OFDM as used herein may be considered to include OFDMA.

Figure 2:
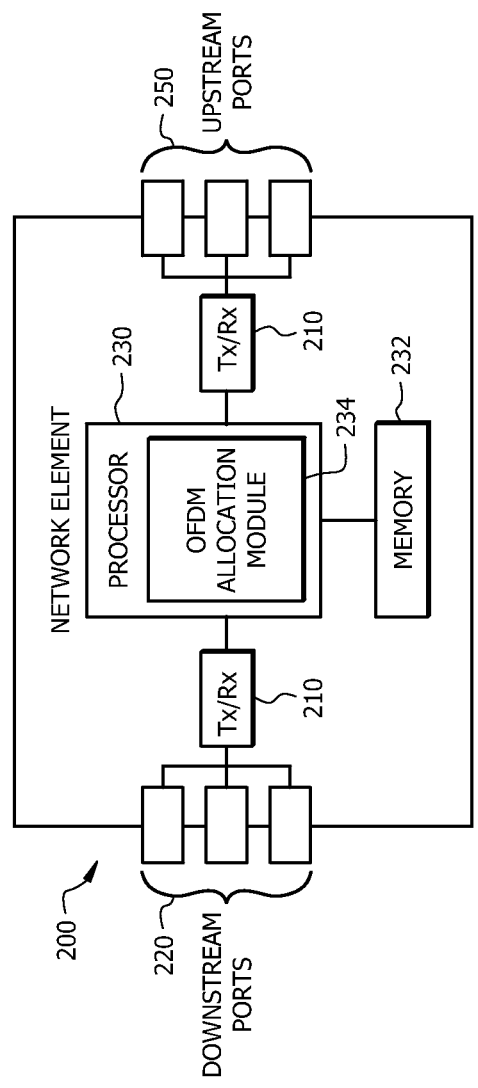
FIG. 2 is a schematic diagram of an embodiment of a Network Element (NE), which may act as a node in a DOCSIS network.

FIG. 2 is a schematic diagram of an embodiment of an NE 200, which may act as a CMTS 110 and/or CM 150 by implementing any of the schemes described herein. In some embodiments NE 200 may also act as other node(s) in network 100. One skilled in the art will recognize that the term NE encompasses a broad range of devices of which NE 200 is merely an example. NE 200 is included for purposes of clarity of discussion, but is in no way meant to limit the application of the present disclosure to a particular NE embodiment or class of NE embodiments. At least some of the features/methods described in the disclosure may be implemented in a network apparatus or component such as NE 200. For instance, the features/methods in the disclosure may be implemented using hardware, firmware, and/or software installed to run on hardware. As shown in FIG. 2, the NE 200 may comprise transceivers (Tx/Rx) 210, which may be transmitters, receivers, or combinations thereof. A Tx/Rx 210 may be coupled to plurality of downstream ports 220 for transmitting and/or receiving frames from other nodes and a Tx/Rx 210 may be coupled to plurality of upstream ports 250 for transmitting and/or receiving frames from other nodes, respectively. A processor 230 may be coupled to the Tx/Rx 210 to process the frames and/or determine which nodes to send the frames to. The processor 230 may comprise one or more multi-core processors and/or memory devices 232, which may function as data stores, buffers, etc. Processor 230 may be implemented as a general processor or may be part of one or more application specific integrated circuits (ASICs) and/or Digital Signal Processors (DSPs). Processor 230 may comprise an OFDM allocation module 234, which may allocate minislots, initiate transmission of MAP messages, process upstream transmission requests, process MAP messages and/or perform the processes discussed herein. In an alternative embodiment, the OFDM allocation module 234 may be implemented as instructions stored in the memory devices 232, which may be executed by processor 230. The memory device 232 may comprise a cache for temporarily storing content, e.g., a Random Access Memory (RAM). Additionally, the memory device 232 may comprise a long-term storage for storing content relatively longer, e.g., a Read Only Memory (ROM). For instance, the cache and the long-term storage may include Dynamic Random Access Memories (DRAMs), Solid-State Drives (SSDs), hard disks, or combinations thereof.

It is understood that by programming and/or loading executable instructions onto the NE 200, at least one of the processor 230 and/or memory device 232 are changed, transforming the NE 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 3:
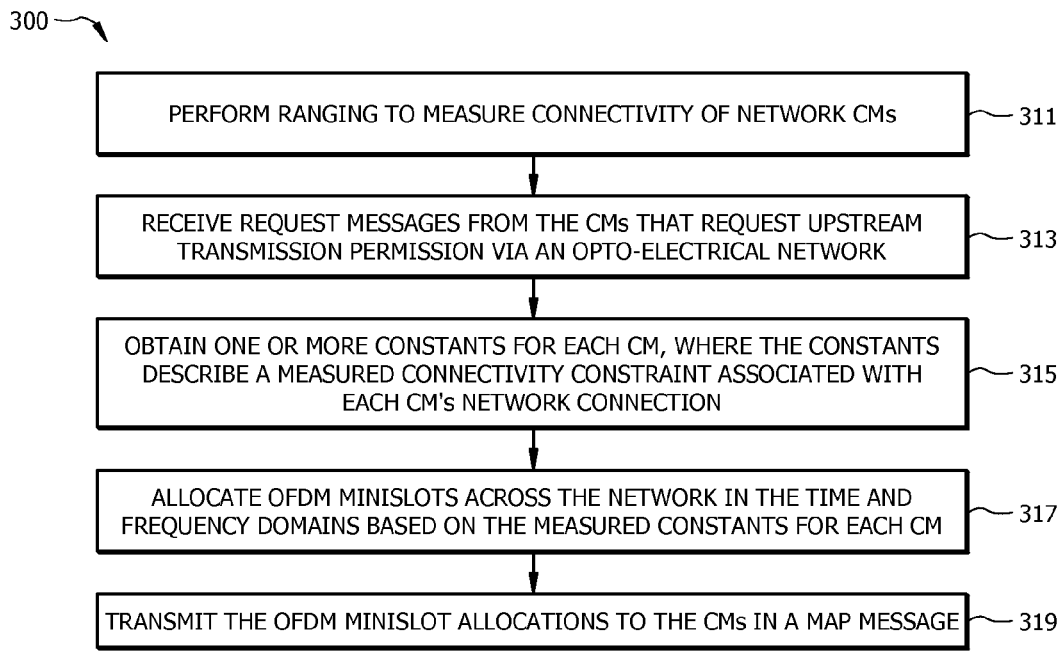
FIG. 3 is a flowchart of an embodiment of a method of OFDM allocation by a CMTS.

FIG. 3 is a flowchart of an embodiment of a method 300 of OFDM allocation by a CMTS, such as CMTS 110. Method 300 may be employed to allocated minislots to CMs (e.g. CMs 150) in an electro-optical network such as network 100. At step 311, ranging may be performed to measure the connectivity constraints of network CMs. For example, ranging may occur when the system is initialized and/or when any new CM starts up. The connectivity constraints may be stored at the CMTS. For example, the CMTS may create one or more bit-loading profiles for each CM and may employ the connectivity constraints when creating the bit-loading profiles. At step 313, requests may be received from the CMs. Each request may indicate a permission request to transmit upstream data across the electro-optical network. Each request may also indicate the amount of data the CM wishes to transmit. At step 315, one or more constants may be obtained for each CM. The constants may describe measured connectivity constraints associated with each CM's network connection, for example as determine during ranging of step 311. As a specific example, the CMTS may obtain the profile of each CM.

At step 317, OFDM minislots may be allocated across the network in the time and frequency domains. The OFDM minislots may be allocated to each CMs based on the measured constants for each CM and/or network connection. The minislots may be allocated according to the network rules as discussed herein. For example, CMs may be allocated resource blocks with different QAM modulation orders/QAM constellations/subcarriers depending on the CM's capabilities so that CMs may not all be required to transmit at a common modulation order shared with the CM with the worst connection in the network. However, the CM may be allocated resources with constant QAM modulation orders/QAM constellations in a minislot. Each minislot may comprise contiguous subcarriers. Each minislot may also comprise pilot signals and/or complementary pilot subcarriers to assist the CMTS to in distinguishing between minislot boundaries. At step 319, the OFDM minislot allocation may be transmitted to the CMs in one or more MAP messages. As an example, an OFDM minislot allocation grant in a MAP message from CMTS to a CM could be five minislots. Three of the minislots may be loaded with CM data using eight bit/256-QAM, while the other two minislots may be loaded with twelve bit/4096-QAM. The bit loading may be the same or different in the five allocated OFDM minislots within a single DOCSIS grant.

Figure 4:
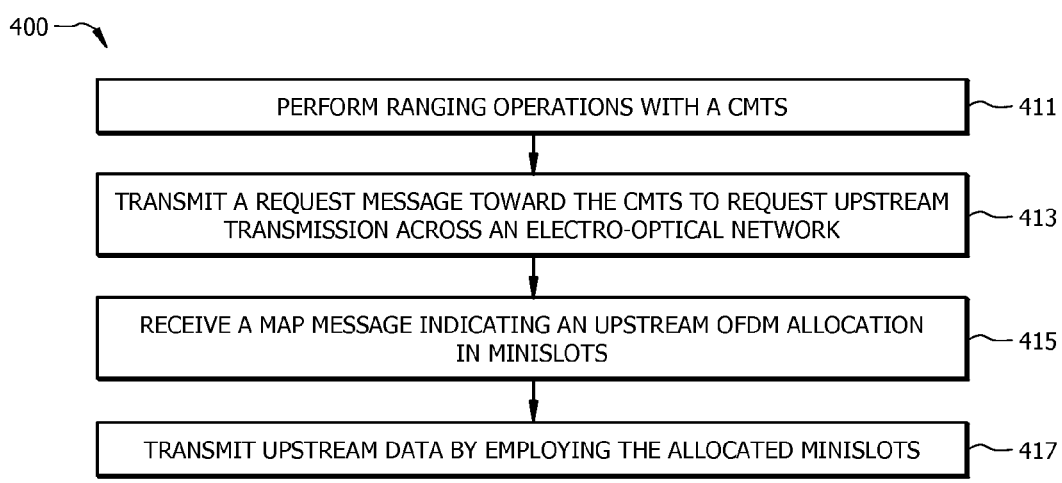
FIG. 4 is a flowchart of an embodiment of a method of upstream transmission by a CM.

FIG. 4 is a flowchart of an embodiment of a method 400 of upstream transmission by a CM, such as CM 150. Method 400 may be used in conjunction with method 300 to allow a CM to obtain a minislot allocation from a CMTS (e.g. CMTS 110) for upstream transmission across an electro-optical network, such as network 100. At step 411, a ranging operation may be performed with a CMTS in a manner similar to step 311. At step 413, a request message may be transmitted toward the CMTS to request permission to transmit upstream data, in a manner similar to step 313. At step 415, a Media Access Plan (MAP) message may be received from the CMTS. The MAP message may indicate an OFDM allocation in minislots for transmission of the upstream data requested in step 413. The minislot allocations may be subject to the network rules as discussed herein. At step 417, the upstream data may be transmitted by employing the allocated minislots. For example, data may be scheduled for transmission sequentially in the time domain across a minislot sub-carrier until the sub-carrier is fully loaded. The data may then be scheduled across the next minislot sub-carrier, etc, until the minislot is completely utilized. In another embodiment, the data may be scheduled across each sub-carrier at the earliest available time block until the earliest available time block is fully utilized. The data may then be scheduled across subcarriers in the next available time block, etc., until the minislot is fully utilized. Once the scheduling is complete, the data may then be transmitted based on the schedule and based on network timing synchronization messages, etc.

Figure 5:
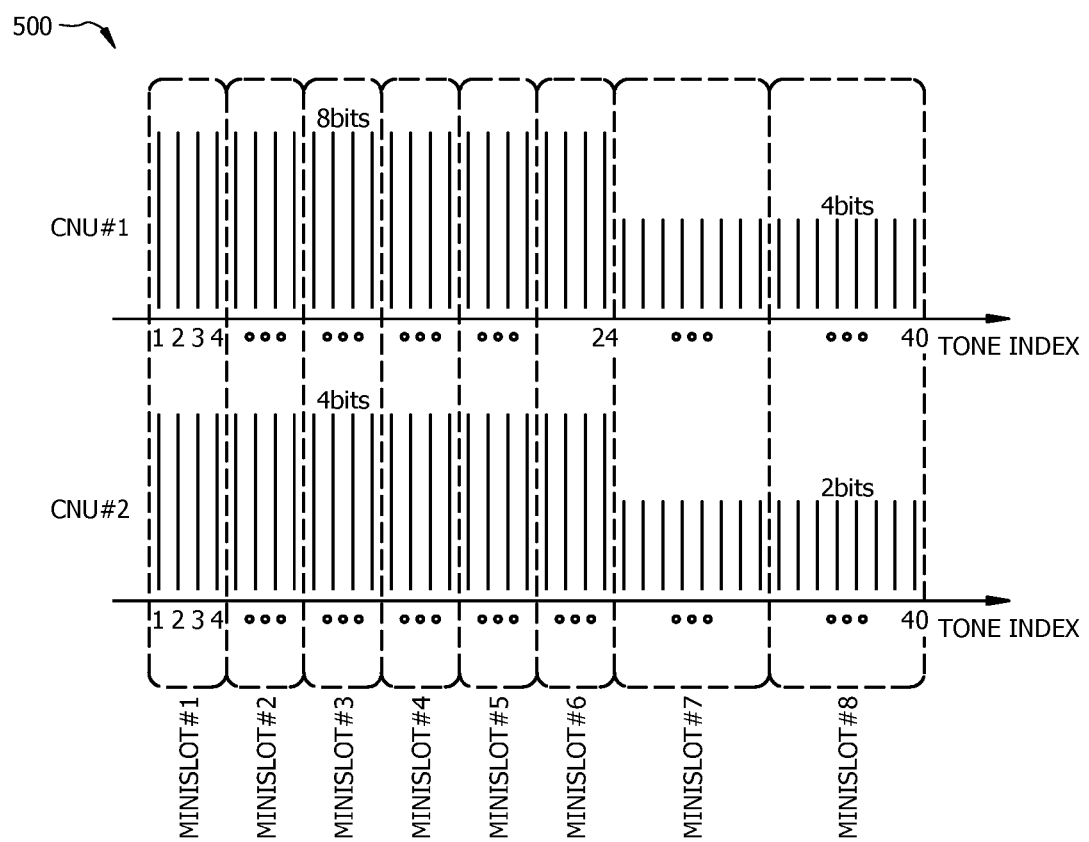
FIG. 5 is a schematic diagram of an embodiment of OFDM allocation by employing minislots with equivalent bit loading capacity.

FIG. 5 is a schematic diagram of an embodiment of OFDM allocation 500 by employing minislots with equivalent bit-loading capacity. OFDM allocation 500 may comprise minislots 1-8. OFDM allocation 500 may apply to an OFDM symbol with forty active subcarriers as indicated by a tone index extending along a horizontal axis. The active subcarriers may not include subcarriers in the frequency spectrum that are not employed for transmission. Minislots 1-8 may be allocated so that each minislot comprises the same bit loading capacity for a given CM. In OFDM allocation 500, minislots 1-6 each comprise four subcarriers, with a bit loading capacity of eight bits per tone (for a CM 1, such as a CM 150), for a total bit loading capacity of thirty two bits per minislot. Minislots 7 and 8 may each comprise eight subcarriers. The subcarriers of minislots 7 and 8 may be of a modulation order with a lower bit loading capacity, in this case four bits per minislot (for CNU 1). By employing eight subcarriers at four bits per tone, minislots 7 and 8 may comprise a bit-loading capacity of thirty two bits per resource block, which may be substantially the same as minislots 1-6. As shown in OFDM allocation 500, the subcarriers may each have a lower bit-loading capacity for CM 2 (e.g. CM 150), for example due to connectivity constraints specific to CM 2, such as SNR. For purposes of clarity, the bit loading capacity for each tone with respect to CM 2 may be half of the bit loading capacity of the same subcarriers for CM 1. Each minislot may comprise the same bit loading capacity as all other minislots, with respect to CM 2. Accordingly, each minislot may comprise a bit loading capacity of sixteen bits with respect to CM 2. As such, each minislot may be defined to have a constant bit-loading value with respect to a specified CM, but may have a different value between CMs for reasons related to connectivity constraints. By employing allocation 500, each CM may be assigned resource blocks that are appropriate to the CM (e.g. variable bit loading capacity between CNUs) instead of assigning resource blocks to each CM with a bit loading capacity based on the CM with the worst connection.

It should be noted that the time dimension of OFDM allocation 500 may be held constant for each CM for clarity of discussion, for example for the duration of an OFDM symbol. Further, a specified CM 1 may not have exactly double the bit loading capacity of a specified CM 2 for all subcarriers. For example, a plurality of CMs may have the same bit loading capacity for tone five, but a first CM may have a bit loading capacity of eight for tone ten, while a second CM may have a bit loading capacity of zero on tone ten due to local interference affecting tone ten at the second CM. In any case, the entity allocating the resource blocks (e.g. CMTS 110) may account for such interference by defining minislots and/or selecting profiles for each CM based on measured conditions, such that all minislots comprise a constant bit loading capacity for a specified CM.

Figure 6:
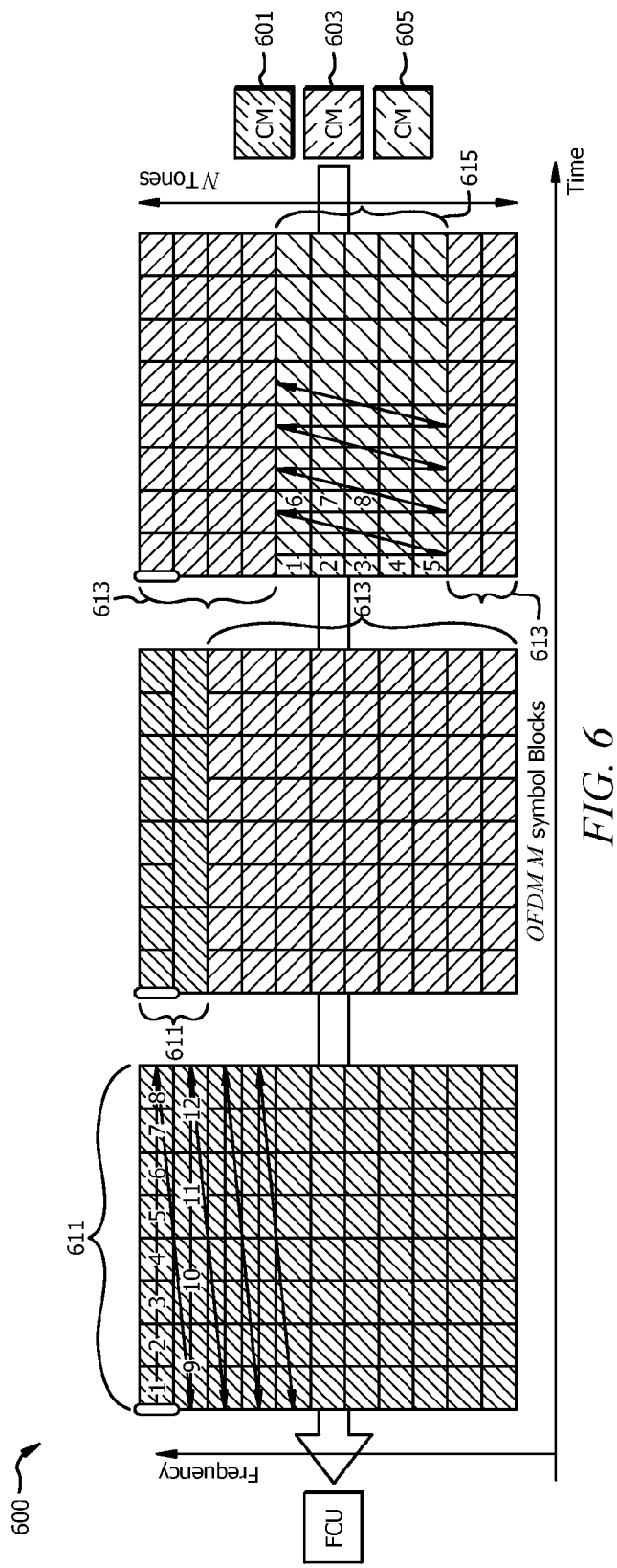
FIG. 6 is a schematic diagram of another embodiment of OFDM allocation by employing minislots with equivalent bit loading capacity.

FIG. 6 is a schematic diagram of another embodiment of OFDM allocation 600 by employing minislots with equivalent bit-loading capacity. OFDM allocation 600 may be similar to OFDM allocation 500, but may also vary across the time domain. In allocation 600, a number of N active subcarriers (e.g. where N equals eleven) may be shown in the vertical axis (frequency domain) and number of OFDM symbol blocks may be shown in the horizontal axis (time domain). Allocation 600 may comprise a total of M OFDM symbols (e.g. where M equals three). The number of boxes per symbol may indicate the bit loading capacity for a specified tone with respect to a specified CM. For example, some subcarriers may comprise four boxes (e.g. bit-loading capacity of four) for a symbol/CM, while other subcarriers may comprise eight boxes (e.g. bit-loading capacity of eight) for a specified symbol/CM. Allocation 600 may be made between CM 601, CM 603, and CM 605, each of which may be substantially similar to CM 150. It should be noted that additional CMs may also be employed and that only three CMs are shown for purposes of clarity. In OFDM allocation 600, a plurality of minislots 611 may be allocated to CM 601 in OFDM symbol one and two, a plurality of minislots 613 may be allocated to CM 603 in OFDM symbols two and three, and a plurality of minislots 615 may be allocated to CM 605 in OFDM symbol three.

Allocation 600 may be made based on a timing value from a CMTS. A time value may comprise a value K, where K is a power of two (e.g. 16 nanoseconds (ns)). The M×N resources (e.g. total number of boxes) in an upstream transmission burst may be equally divided by K, which may result in resource block groups each having a common bit-loading capacity. As such, the total bit loading capacity of a minislot may be determined by the equation $MS_{bc}=M\times N_{bc}/K$, where K may be a power of two, $MS_{bc}$ may be the bit-loading capacity of the minislots, and $M\times N_{bc}$ may be the bit-loading capacity of the resources available in the transmission burst. The minislots may then be assigned to each CM based on the amount of data the CM requests for upstream transmission. As shown in allocation 600, each CM may map data to allocated resource blocks by employing a local mapping. For example, CM 601 may map data into boxes along the horizontal axis (time domain) until a tone of a symbol reaches capacity before moving to the next tone. As another example, CM 605 may map data to each tone in the vertical axis (frequency domain) until all subcarriers are employed before moving to the next time portion of the symbol. Allocation 600 may be encoded and transmitted to the CMs in a MAP message.

Figure 7:
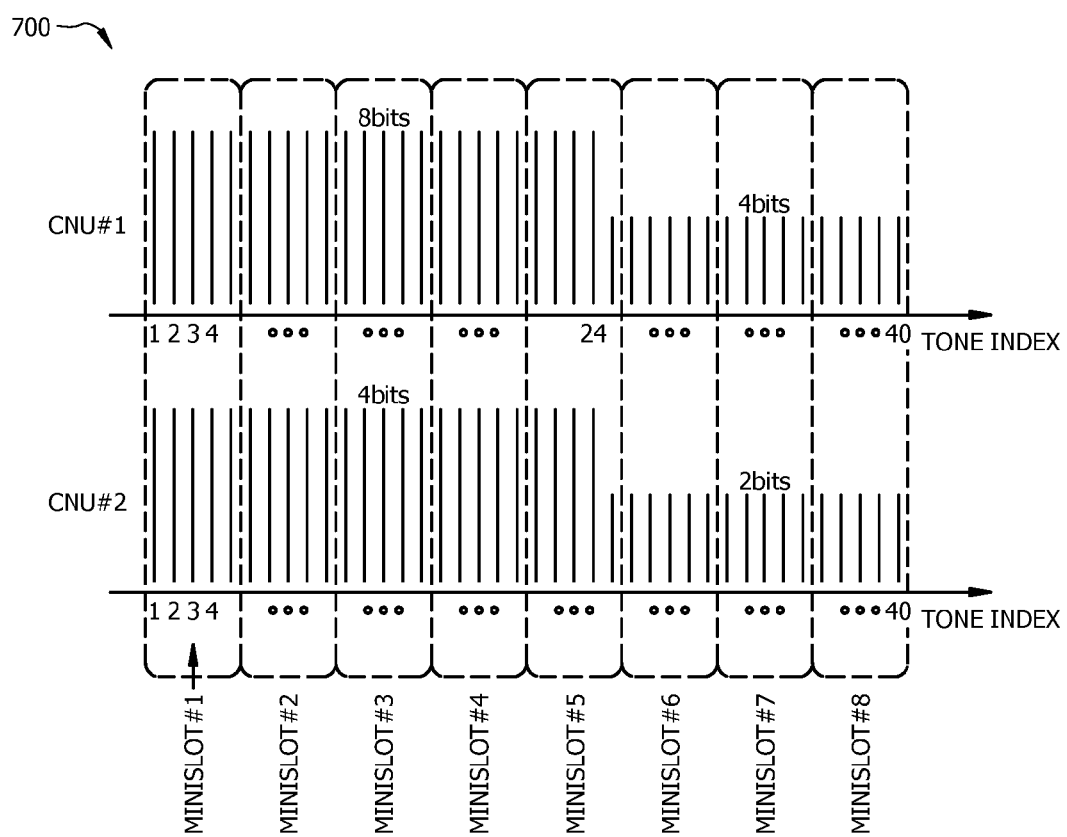
FIG. 7 is a schematic diagram of an embodiment of OFDM allocation by employing minislots with an equivalent number of subcarriers.

FIG. 7 is a schematic diagram of an embodiment of OFDM allocation 700 by employing resource blocks with an equivalent number of subcarriers. Allocation 700 may be similar to allocation 500, but may employ a constant number of subcarriers per minislot. For example, minislots 1-8 may each comprise five subcarriers regardless of bit-loading capacity. In OFDM allocation 700, with respect to CM 1, minislots 1-4 may have a bit-loading capacity of forty (five subcarriers of eight bits each), minislot 5 may have a bit-loading capacity of thirty six (four subcarriers of eight bits and one tone of four bits), and minislots 6-8 may have a bit-loading capacity of twenty (five subcarriers of four bits each). With respect to CM 2, minislots 1-4 may have a bit-loading capacity of twenty (five subcarriers of four bits each), minislot 5 may have a bit-loading capacity of eighteen (four subcarriers of four bits and one tone of two bits), and minislots 6-8 may have a bit-loading capacity of ten (five subcarriers of two bits each). By holding tone number constant per minislot, the minislots may be allocated based on the number of active subcarriers available instead of based on data carrying capacity.

Figure 8:
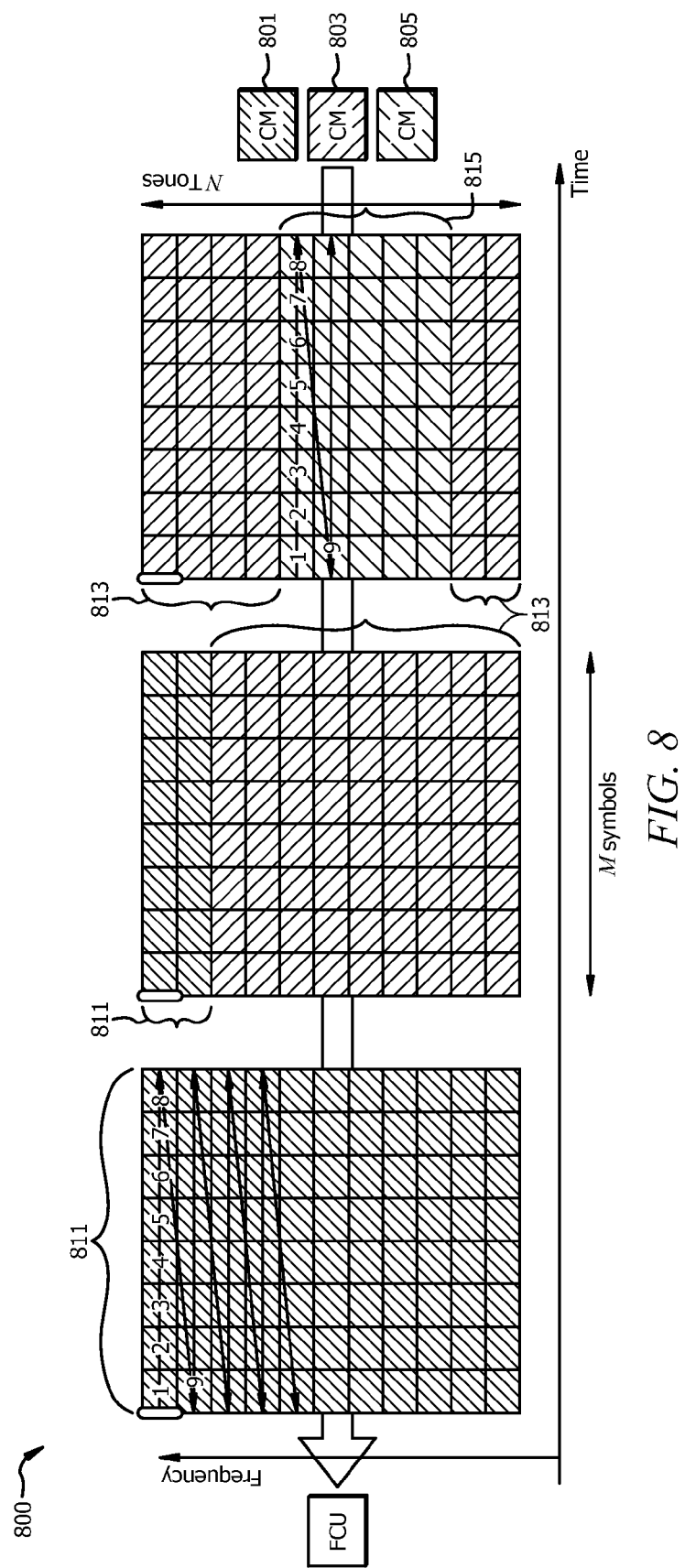
FIG. 8 is a schematic diagram of another embodiment of OFDM allocation by employing minislots with an equivalent number of subcarriers.

FIG. 8 is a schematic diagram of another embodiment of OFDM allocation 800 by employing minislots with an equivalent number of subcarriers. Allocation 800 may be similar to allocation 600, but may hold the number of subcarriers constant per minislot. For example, CMs 801, 803, and 805 may be substantially similar to CMs 601, 603, and 605, respectively, and may be assigned a plurality of minislots 811, 813, and 815, respectively. As in allocation 600, the allocation 800 may comprise M×N resources (M symbols with N subcarriers) that correspond to a time value of K. However, allocation 800 may be completed by dividing the total resources by a constant number of subcarriers instead of calculating based on bit-loading capacity. In allocation 800, $MS_T=M_T/K$, where $MS_T$ may be the number of subcarriers per minislot, $M_T$ may be the number subcarriers in the M symbols, and K may be the time value allocated for the transmission in the optical domain. Allocation 800 may be encoded and transmitted to the CMs in a MAP message.

It should be noted that for DOCSIS 3.1 channels, a minislot may not be restricted to be a power-of-two multiple of 6.25 microsecond increments. Instead a minislot may be a unit of capacity that may be dependent on the number of subcarriers per minislot and the number of symbols in the OFDMA frame. The modulation rate on an OFDMA channel can vary from one minislot to the next and may be dependent on the specific subcarriers contained within the minislot. All other subcarriers may be mapped to minislots where minislots may be composed of contiguous subcarriers in an OFDMA frame. In an example, there may be eight contiguous subcarriers per minislot. On OFDMA channels, the size of a minislot in total symbols may be fixed for the channel. The size may be specified by the number of symbols in a frame combined with the number of subcarriers per minislot. The bit loading and pilot pattern may be variable per minislot based on the minislot location in the frame and the burst profile being used. Thus, a minislot's capacity may be profile dependent. The modulation order of a minislot, as well as the pilot pattern to use may change between different transmission bursts and may be determined by a transmission profile. All data subcarriers in a minislot may have the same QAM constellation. All complementary data subcarriers in a minislot may also have the same QAM constellation, but may be lower in order than that of the data subcarriers in that minislot. Furthermore, the QAM constellations of data and complementary pilots may not be the same for all minislots in a grant.

CMs may be granted transmission opportunities by minislots, and minislots may be associated with subcarriers. All subcarriers of a specific type (data subcarriers, pilots, complementary pilots, null subcarriers) within a minislot may have the same modulation order, although different minislots may have different modulation orders; the modulation order to be used may be determined by the profile associated with the minislot. Pilots may be used by the CMTS receiver to adapt to channel conditions and frequency offset. DOCSIS 3.1 may specify two minislot types, differing in the number of subcarriers per minislot, 8- and 16-subcarrier minislots.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g. from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Unless otherwise stated, the term "about" means±10% of the subsequent number. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A Cable Modem Termination System (CMTS) comprising:
a receiver configured to receive a plurality of upstream transmission request messages from a plurality of coaxial units via an electro-optical network, wherein the upstream transmission request messages each request permission to transmit a specified amount of data;
a processor coupled to the receiver and configured to allocate Orthogonal Frequency-Division Multiplexing (OFDM) minislots to each coaxial unit based on the amount of data requested in the associated upstream transmission request message; and
a transmitter coupled to the processor and configured to transmit at least one uplink allocation map (UL-MAP) message to indicate minislot allocations to the coaxial units,
wherein all OFDM minislots in an allocation for a first of the coaxial units comprise a common bit loading capacity.

2. The CMTS of claim 1, wherein an allocation for a first of the coaxial units comprises a plurality of OFDM minislots, and wherein at least two of the OFDM minislots in the allocation comprise a different Quadrature Amplitude Modulation (QAM).

3. The CMTS of claim 1, wherein each OFDM minislot comprises a common number of active subcarriers as all other OFDM minislots.

4. The CMTS of claim 1, wherein the OFDM minislots are assigned based on connectivity constraints associated with each coaxial unit determined during ranging.

5. The CMTS of claim 1, wherein each OFDM minislot comprises a plurality of non-pilot data subcarriers in a frequency domain, and wherein all non-pilot data subcarriers in a common minislot comprise a common Quadrature Amplitude Modulation (QAM).

6. The CMTS of claim 5, wherein each OFDM minislot further comprises a plurality of pilot subcarriers, wherein the pilot subcarriers are employed by the CMTS to distinguish between minislots, and wherein all pilot subcarriers in a common minislot comprise a common QAM.

7. The CMTS of claim 6, wherein the pilot subcarriers of each OFDM minislot comprise a common modulation order with or a lower modulation order than associated non-pilot data subcarriers in a common OFDM minislot.

8. A Cable Modem (CM) comprising:
a transmitter configured to transmit an upstream transmission request message toward a Cable Modem Termination System (CMTS) via a Data Over Cable Services Interface Specification (DOCSIS) based electro-optical network, wherein the upstream transmission request message requests permission to transmit a specified amount of data;
a receiver configured to receive an Uplink Allocation Map (UL-MAP) message in response the upstream transmission request message, wherein the UL-MAP message indicates an Orthogonal Frequency-Division Multiplexing (OFDM) minislot allocation for transmission across the electro-optical network; and
a processor coupled to the transmitter and the receiver and configured to cause the transmitter to transmit the data by employing time and frequency resources indicated by the OFDM minislot allocation,
wherein the CM is further configured to transmit the data by employing a plurality of OFDM minislots, and wherein each minislot comprises a common number of active subcarriers.

9. The CM of claim 8, wherein a first of the OFDM minislots comprises a plurality of active subcarriers in a frequency domain, and wherein all active subcarriers comprise a common Quadrature Amplitude Modulation (QAM) constellation.

10. The CM of claim 9, wherein the first OFDM minislot comprises a plurality of pilot subcarriers in a frequency domain, and wherein all pilot subcarriers comprise a common QAM.

11. The CM of claim 10, wherein the processor is further configured to cause at least some of the data to be transmitted by employing at least one of the pilot subcarriers.

12. A method comprising:
receiving, by a Cable Modem Termination System (CMTS), a Request (REQ) message from a Cable Modem (CM) to request transmission opportunities;
transmitting an Upstream Bandwidth Allocation Map message to the CM to allocate bandwidth on an Orthogonal Frequency-Division Multiple Access (OFDMA) upstream channel in units of minislots,
wherein the minislots comprise a fixed size specified by a number of symbols a frame combined with a number of data subcarriers per minislot,
wherein the minislots comprise a variable bit loading based on a location of each minislot in the frame, and
wherein each minislot employs only contiguous subcarriers.

13. The method of claim 12, wherein the minislots comprise sixteen data subcarriers when sub-carrier spacing is 25 kilohertz (kHz).

14. The method of claim 12, wherein the minislots comprise eight data subcarriers when sub-carrier spacing is 50 kilohertz (kHz).

15. The method of claim 12, wherein each minislot's data subcarriers all comprise a same modulation order.

16. The method of claim 12, wherein each minislot is assigned a plurality of pilot sub-carrier patterns used by a receiver of the CMTS to adapt channel conditions and frequency offset.

17. The method of claim 16, wherein the pilot sub-carrier patterns are complimentary subcarriers that carry data, but with a lower modulation order than the data subcarriers.

* * * * *

UNITED STATES PATENT AND TRADEMARK OFFICE
CERTIFICATE OF CORRECTION

PATENT NO.        : 9,444,594 B2
APPLICATION NO.   : 14/258428
DATED             : September 13, 2016
INVENTOR(S)       : Sun et al.

It is certified that error appears in the above-identified patent and that said Letters Patent is hereby corrected as shown below:

In the claims

Column 13; Line 60, claim 8 should read:
8. A Cable Modem (CM) comprising:
    a transmitter configured to transmit an upstream transmission request message toward a Cable Modem Termination System (CMTS) via a Data Over Cable Services Interface Specification (DOCSIS) based electro-optical network, wherein the upstream transmission request message requests permission to transmit a specified amount of data;
    a receiver configured to receive an Uplink Allocation Map (UL-MAP) message in response to the upstream transmission request message, wherein the UL-MAP message indicates an Orthogonal Frequency-Division Multiplexing (OFDM) minislot allocation for transmission across the electro-optical network; and
    a processor coupled to the transmitter and the receiver and configured to cause the transmitter to transmit the data by employing time and frequency resources indicated by the OFDM minislot allocation,
    wherein the CM is further configured to transmit the data by employing a plurality of OFDM minislots, and wherein each minislot comprises a common number of active subcarriers.

Column 14; Line 37, claim 12 should read:
12. A method comprising:
    receiving, by a Cable Modem Termination System (CMTS), a Request (REQ) message from a Cable Modem (CM) to request transmission opportunities;
    transmitting an Upstream Bandwidth Allocation Map message to the CM to allocate bandwidth on an Orthogonal Frequency-Division Multiple Access (OFDMA) upstream channel in units of minislots,
    wherein the minislots comprise a fixed size specified by a number of symbols in a frame combined with a number of data subcarriers per minislot,
    wherein the minislots comprise a variable bit loading based on a location of each minislot in the frame, and
    wherein each minislot employs only contiguous subcarriers.

Signed and Sealed this
Thirteenth Day of December, 2016

Michelle K. Lee
*Director of the United States Patent and Trademark Office*